United States Patent
Mischke et al.

(10) Patent No.: US 10,528,245 B2
(45) Date of Patent: Jan. 7, 2020

(54) METHOD FOR DESIGNATING A SUBSET OF A BASIC SET OF DATA RECORDS STORED IN A MEMORY UNIT AND FOR VISUALIZING AT LEAST A PART OF THE DESIGNATED SUBSET ON A DISPLAY UNIT

(71) Applicant: VOLKSWAGEN AG, Wolfsburg (DE)

(72) Inventors: Michael Mischke, Hannover (DE); Manuel Joachim, Braunschweig (DE); Michael Wittkämper, Braunschweig (DE); Günter Horna, Munich (DE)

(73) Assignee: Volkswagen AG (DE)

( * ) Notice: Subject to any disclaimer, the term of this patent is extended or adjusted under 35 U.S.C. 154(b) by 170 days.

(21) Appl. No.: 14/653,666

(22) PCT Filed: Dec. 3, 2013

(86) PCT No.: PCT/EP2013/075429
§ 371 (c)(1),
(2) Date: Jun. 18, 2015

(87) PCT Pub. No.: WO2014/095357
PCT Pub. Date: Jun. 26, 2014

(65) Prior Publication Data
US 2015/0331572 A1  Nov. 19, 2015

(30) Foreign Application Priority Data
Dec. 20, 2012 (DE) .......... 10 2012 024 954

(51) Int. Cl.
*G06F 3/0486* (2013.01)
*G06F 3/0484* (2013.01)
(Continued)

(52) U.S. Cl.
CPC .......... *G06F 3/0486* (2013.01); *G06F 3/0482* (2013.01); *G06F 3/04817* (2013.01); *G06F 3/04842* (2013.01)

(58) Field of Classification Search
CPC ............... G06F 3/0486; G06F 3/04842; G06F 3/04817; G06F 3/0482
See application file for complete search history.

(56) References Cited

U.S. PATENT DOCUMENTS 6,953,886 B1 * 10/2005 Looney ................ G10H 1/0041
84/615
2001/0018715 A1 * 8/2001 Stern ..................... G06F 3/0486
719/313
(Continued)

FOREIGN PATENT DOCUMENTS

CN 102662586 A 9/2012
CN 102789353 A 11/2012
(Continued)

OTHER PUBLICATIONS

Leonhard, "Windows 7 All-In-One for Dummies", Copyright 2009, Wiley Publishing Inc.*
(Continued)

*Primary Examiner* — Seth A Silverman
(74) *Attorney, Agent, or Firm* — Barnes & Thornburg LLP

(57) ABSTRACT

A method for designating a subset of a basic set of data records stored in a memory unit and for visualizing at least a part of the designated subset on a display unit. To designate the subset on the display unit, at least two graphically delimited display regions are formed. Objects representing data records from the basic set are displayed in a first display region and the subset of objects designated or to be designated is assigned to a second display region. A subset is designated by highlighting at least one object in the first
(Continued)

display region, moving the highlighted at least one object into the second display region and cancelling the highlighting. This allows a highly intuitive designation of a subset of datasets from a basic set. The designation method can be used particularly for generating playback lists of MP3 files.

13 Claims, 12 Drawing Sheets

(51) Int. Cl.
  *G06F 3/0481* (2013.01)
  *G06F 3/0482* (2013.01)

(56) References Cited

U.S. PATENT DOCUMENTS

| | | | | |
|---|---|---|---|---|
| 2002/0113824 | A1* | 8/2002 | Myers, Jr. | G06F 3/0481 715/810 |
| 2003/0048309 | A1* | 3/2003 | Tambata | G01C 21/3664 715/810 |
| 2003/0234804 | A1* | 12/2003 | Parker | G06F 3/0231 715/719 |
| 2006/0195790 | A1* | 8/2006 | Beaupre | G06F 17/30766 715/727 |
| 2008/0005688 | A1 | 1/2008 | Najdenovski | |
| 2008/0022228 | A1* | 1/2008 | Kwon | G06F 3/04817 715/838 |
| 2008/0313222 | A1 | 12/2008 | Vignoli et al. | |
| 2009/0164473 | A1 | 6/2009 | Bauer | |
| 2009/0193351 | A1 | 7/2009 | Lee et al. | |
| 2011/0022393 | A1* | 1/2011 | Waller | G01C 21/3608 704/270 |

FOREIGN PATENT DOCUMENTS

| | | |
|---|---|---|
| DE | 102006009671 A1 | 9/2007 |
| DE | 102009024570 A1 | 12/2010 |
| EP | 1801711 A1 | 6/2007 |
| EP | 1850092 A1 | 10/2007 |
| EP | 1939880 A1 | 7/2008 |
| EP | 2284730 A1 | 2/2011 |
| EP | 2477127 A1 | 7/2012 |
| JP | 2008543171 A | 11/2008 |
| WO | 2004008460 A1 | 1/2004 |

OTHER PUBLICATIONS

Search Report for German Patent Application No. 10 2012 024 954.3; dated Jul. 11, 2013.
Search Report for International Patent Application No. PCT/EP2013/075429; dated Jul. 16, 2014.
Office Action for Chinese Patent Application No. 201380067168.8; dated Jul. 5, 2017.
Office Action for Chinese Patent Application No. 201380067168.8; dated Mar. 18, 2019.

* cited by examiner

METHOD FOR DESIGNATING A SUBSET OF A BASIC SET OF DATA RECORDS STORED IN A MEMORY UNIT AND FOR VISUALIZING AT LEAST A PART OF THE DESIGNATED SUBSET ON A DISPLAY UNIT

PRIORITY CLAIM

This patent application is a U.S. National Phase of International Patent Application No. PCT/EP2013/075429, filed 3 Dec. 2013, which claims priority to German Patent Application No. 10 2012 024 954.3, filed 20 Dec. 2012, the disclosures of which are incorporated herein by reference in their entirety.

SUMMARY

Illustrative embodiments relate to a method for designating a subset of a basic set of data records stored in a memory unit and for visualizing at least a part of the designated subset on a display unit.

Illustrative embodiments provide an alternative method of the generic type which can be carried out in an intuitive manner.

BRIEF DESCRIPTION OF THE DRAWINGS

Exemplary embodiments are illustrated in the drawings and are explained in more detail in the following description. In this case, identical reference symbols relate to identical, comparable or functionally identical components, in which case corresponding or comparable properties and advantages are achieved even if a repeated description has been omitted. In the drawings, in each case in schematic form.

DETAILED DESCRIPTION OF THE DISCLOSED EMBODIMENTS

Figure 1A:
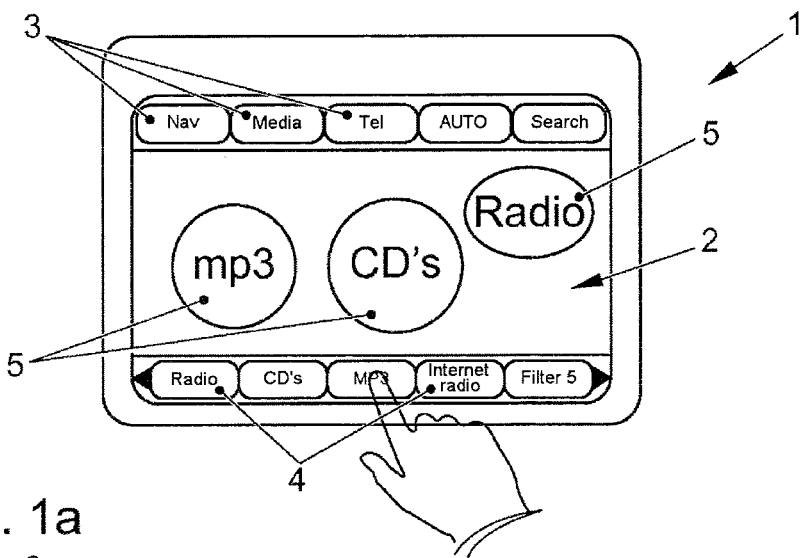
FIGS. 1a-g show first steps for creating a new playlist using the disclosed method.

Disclosed embodiments provide a method for designating a subset of a basic set of data records stored in at least one memory unit and for visualizing at least a part of the designated subset on a display unit.

To designate the subset from the basic set, the disclosed embodiments provide for at least two graphically delimited display regions to be formed on the display unit, designation objects which represent data records from the basic set being displayed in a first display region and the subset of the designation objects which has been designated or is to be designated being assigned to a second display region, and a subset being designated by marking at least one designation object in the first display region, moving the marked at least one designation object into the second display region and subsequently removing the marking.

In other words, a subset of the data records is designated by means of a procedure which is colloquially also referred to as "drag-and-drop". The use of a "drag-and-drop" operation has hitherto been completely unusual for designating a subset of data records from a basic set of data records and can be used in an extremely expedient manner to create a playlist, for example.

In this manner, it is therefore possible for the user to designate a subset of data records from a basic set of data records in an extremely intuitive manner. The type of data records may be very different in this case. For example, they may be pure audio data records (for example MP3), video data records (for example MP4), contact data records (for example names, addresses, telephone numbers) or else map data records for a navigation system.

A selected subset from these basic sets of data records then respectively corresponds, for example, to a playlist for audio or video files, a favorites list of existing contacts or else, for example, a favored route with towns and attractions to be called at in succession.

The subset is therefore designated by the user in a purely graphical manner by means of drag-and-drop, in which case a purely logical designation is made. In this case, a designated data record is not logically taken from the basic set of data records, rather the designated data record still remains logically assigned to the basic set which is represented by the first display region. Only an additional logical assignment to the second display region is made as a result of the designation.

At least one disclosed embodiment provides for the second region to be changed or to be able to be changed in such a manner that at least a part of the designated subset is displayed on the display unit instead of at least a part of the basic set.

In this manner, an operator can change between two views in a very simple, intuitive manner. In one view, the user can have all available MP3 files or (if the size of a display surface of the display unit does not suffice) only some of the available MP3 files displayed, for example, whereas the designated MP3 files which therefore form a playlist are displayed in the other view, for example. In this case too, only a part of the designated subset can again be displayed depending on the size of the display surface and the size of the designated subset.

In both cases, however, it is possible to move the respectively displayed section of the visible graphical designation objects by means of common moving and swiping gestures using a suitable operating unit.

Depending on the use of the method in the specific technical environment, the display unit and the operating unit can come apart or else can coincide, for example when a touchpad is used as the operating unit for an LCD screen, on the one hand, or when a touchscreen is used as the simultaneous operating and display unit, on the other hand.

In this case, the size, shape and/or position of the second region can be changed. For example, after the second region has been marked or activated (for example by tapping on it when using a touchscreen), the second region can suddenly increase in size in the manner of a pop-up region in a known manner.

However, in another disclosed embodiment, it has been shown that the second region is expediently changed, as seen in a plan view of a display surface of the display unit, by moving a boundary of the second region in the transverse direction or vertical direction of the display surface. The boundary can be graphically displayed on a display unit in a linear manner, for example.

According to another disclosed embodiment, to display the at least one part of the basic set or the at least one part of the designated subset, the boundary of the second region is moved from one side of the display surface in the direction of an opposite side of the display surface or can be moved in this manner.

In this manner, the second region can be pulled into the display surface of the display unit virtually in a "drawer-like" manner or can largely be moved from the display surface again. This fits very well with the natural feeling and understanding of the user. He understands the second display region to be a drawer into which he can place objects and/or from which he can remove objects as required.

At least one disclosed embodiment also provides for the basic set and/or the designated subset of the data records stored in the memory unit to be able to be displayed or to be displayed on the display unit in a map-like structure, and for the map-like structure to be organized in a two-dimensional manner when displaying the basic set and/or the designated subset in a plan view of the display unit in such a manner that a first sorting criterion is effective along a transverse axis and a second sorting criterion is effective along a vertical axis.

With respect to music files, information stored in the data records such as the name of an artist, speed of a music title, year of release of a title or album and music genre of a title or an album may be the sorting criteria, for example.

The two-dimensional organization shall also be referred to as filters below. Any desired number of filters is conceivable, in which case, in addition to the sorting criteria, criteria devised by the user can also be stipulated, for example "I do not like as much" or "I prefer", "in a good mood" or "in a bad mood". Such criteria which can be stipulated by the user himself are therefore extremely personalized and provide the user with ideal pre-sorting of the data records to be able to find, in particular, the data records to be designated for a playlist in an even more intuitive and quick manner according to the user's taste.

When creating favorites lists from contact data records or when planning a route from a basic set of localities with the aid of a navigation system, very different sorting criteria may again play a role.

The data records can be expediently filled with such information necessary for sorting before the method is carried out in a suitable, computer-assisted system.

Optical, acoustic and/or haptic feedback is advantageously provided after a data record has been successfully designated. In this manner, the user can be certain that an operation has been carried out as desired. Such feedback may be provided, for example, by means of a small animation inside the second display region, by means of a vibration of a part of an operating device and/or by means of a change in color and/or size of a designation object designated.

According to another disclosed embodiment, in a similar manner to the designation of a data record, a designation of a data record is removed by marking a designation object in the second display region, moving the marked designation object into the first display region and subsequently removing the marking.

At least one disclosed embodiment also provides for an animation to be able to be activated or to be activated, in which the second display region changes from a maximum size to a minimum size. Such an animation can be effected, in particular, before the designation objects are designated, that is to say immediately before a playlist is created, for example.

Provision may also be expediently made for an animation to be able to be activated or to be activated, in which the second display region changes from a minimum size to a maximum size. Such an animation can be effected, in particular, before a designation of the designation objects is removed, that is to say immediately before music albums or music titles are removed from a playlist, for example.

However, the disclosure also relates to a driver assistance system in a motor vehicle, having at least one information processing unit, at least one memory unit which is or can be connected, at least one input unit and at least one display unit, data records being stored or being able to be stored in the at least one memory unit, which data records can be designated according to the method using the at least one input unit and can be visualized using the at least one display unit.

As a result of such a driver assistance system, the effort needed to create a playlist, for example, can be considerably reduced and can therefore also be carried out in the motor vehicle in a practical, intuitive and timely manner. Tedious, list-based creation of playlists or favorites lists at home on a computer, separated from the driver assistance system in the motor vehicle, is therefore no longer absolutely necessary.

Reference is first of all made to FIG. 1 which shows a display unit 1 in a so-called touchscreen having a touch-sensitive display surface 2. Keys 3 (so-called hard keys) which are permanently assigned to particular functions and to which the callable functional groups of "navigation", "media", "telephone", "automobile" and "search" may be assigned, for example, can be seen on the display surface 2.

Figure 6:
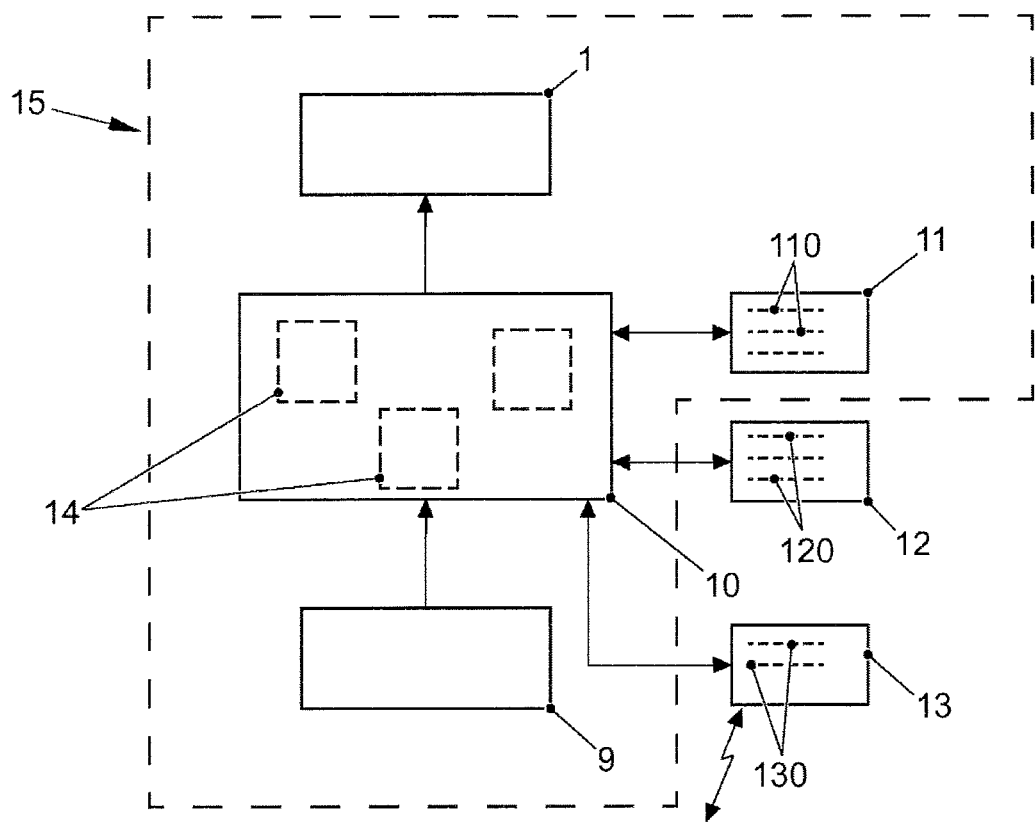
FIG. 6 shows a driver assistance system for carrying out the disclosed method.

The display unit 1 is part of a driver assistance system which, in addition to navigation functions, also comprises infotainment, telematic and adjustment functions for a motor vehicle (for example air-conditioning, heating and security functions) (cf. also FIG. 6).

Keys 4 having functions assigned on the basis of context (so-called soft keys) can also be seen in the lower region of the display surface 2.

The functional region "media" has already been selected by an operator in FIG. 1a. Groups of data records stored in a memory are therefore initially displayed as object clusters 5 on the display surface 2. Such object clusters 5 may be, for example, the entirety of all available MP3 files (music albums, music titles), all available CDs in a CD changer and/or else all available links to Internet radio stations.

In the lower part of the display surface 2, the keys 4 are assigned those functions which allow the media groups to be directly selected. The key "filter 5" indicates that further media not mentioned here can also be directly selected.

Figure 1B:
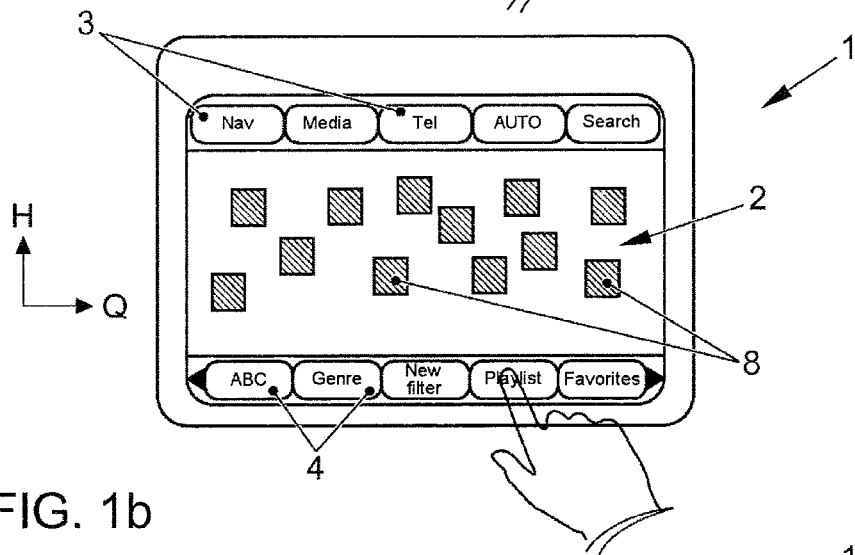

After the key 4 "MP3" has been selected or as a result of the object cluster 5 "MP3" being touched, all available albums 8 are displayed on the display surface 2 (cf. FIG. 1b). If the number of available albums 8 is so large that they can no longer be displayed on the display surface 2, only a section of the set of available albums 8 is displayed and the user is graphically made aware of the fact that he can produce another image section by means of moving or swiping gestures on the display surface 2 and can therefore have another subset of all available albums 8 displayed.

The keys 4 also have a different assignment in this context and make it possible for the operator to choose between different types of sorting of the available albums 8.

It is apparent that the albums 8 are not displayed in a list but rather in a map as the default. The display is affected here in a two-dimensional manner, that is to say the sorting according to a first sorting criterion is effected in the direction of a transverse axis Q of the display surface 2 and the sorting according to a second sorting criterion is effected in a vertical axis H of the display surface 2.

The operator can select sorting criteria predefined as standard by touching keys 4. He can choose a display ("ABC") in which names of musicians are sorted alphabetically on the vertical axis H and the year of release of albums 8 is chronologically sorted at the same time on the transverse axis Q. However, he can also select a display ("genre") in which the music genre (for example classical, pop, jazz) is plotted on the vertical axis H and the year of release or else the speed of the music is in turn plotted on the transverse axis Q.

However, the operator also has the option of choosing a display according to entirely his own specifications ("new filter"). Such a display can display the taste ("I like" or "I don't like") on the transverse axis Q and can display the speed of the available music on the vertical axis H, for example.

This makes it possible to select display or sorting criteria which can be individualized to the greatest extent and make it possible to intuitively and quickly find desired music files as the basis for a playlist to be created.

Finally, there is also a key 4 ("favorites") which can be used to call up predefined favorites. This function may be activated accumulatively to one of the sorting criteria already described, with the result that the favorites appear on the vertical axis H in a manner sorted according to the names of the available musicians and appear on the transverse axis Q in a manner sorted according to the year of release of the albums, for example.

Figure 1C:
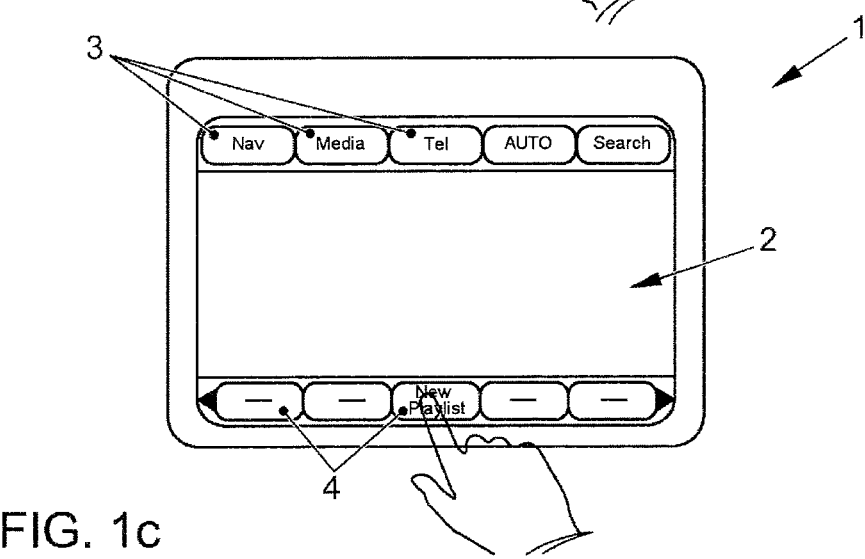
Figure 1D:
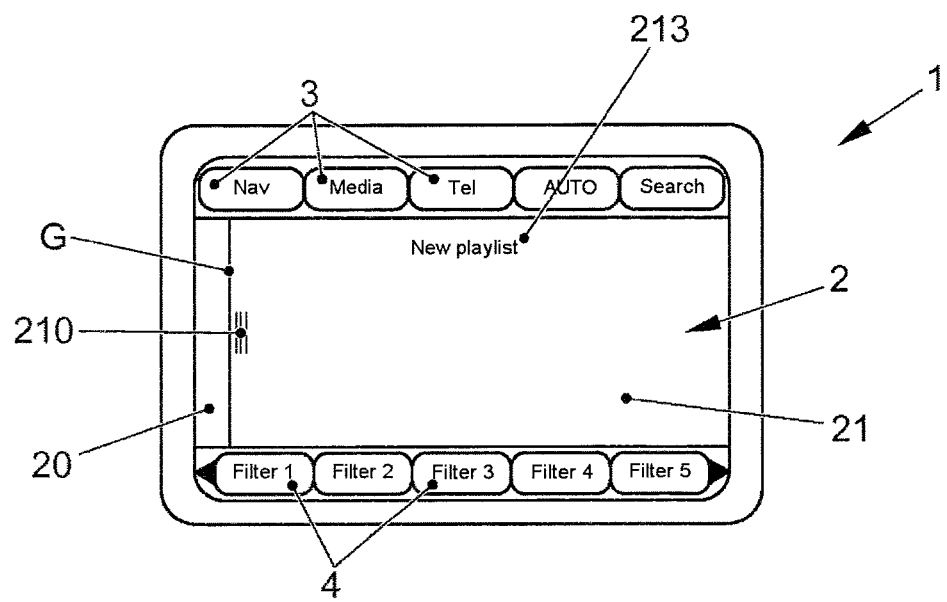
Figure 1E:
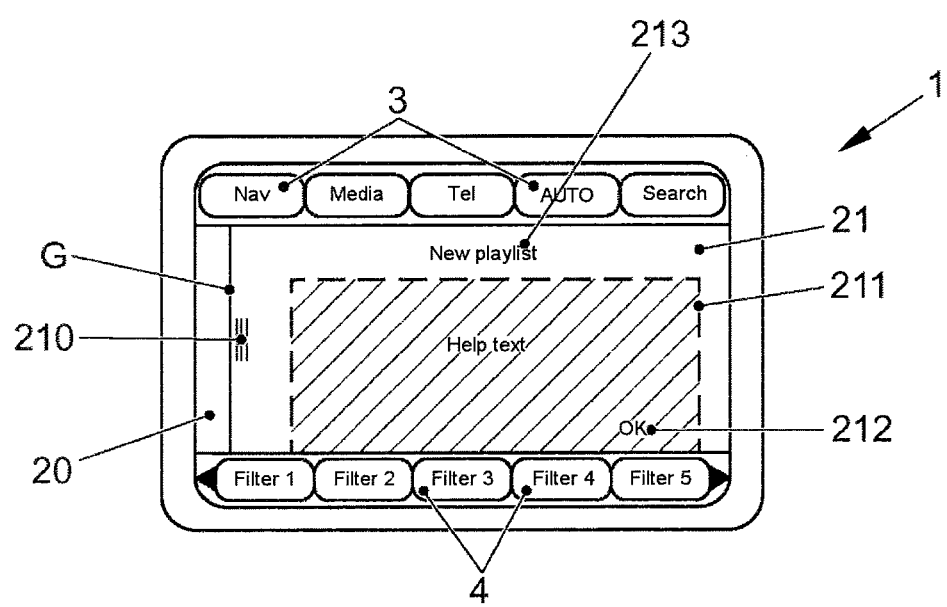

If the operator now wishes to call up existing playlists from this display or to create a new playlist, he actuates a corresponding key 4 ("playlist") and therefore arrives at the display according to FIG. 1c. Since a playlist has not yet been produced in the present exemplary embodiment, only one of the keys 4 is assigned and the operator arrives at a display according to FIG. 1d by accordingly touching this key 4 ("new playlist").

In this display, that region of the display surface 2 which is between the keys 3 and 4 is graphically divided into a first display region 20 and a second display region 21. The display regions 20, 21 are separated from one another by a linear boundary G running vertically in the figure. The display region 20 is initially much smaller than the display region 21.

A text field 213 is also displayed in the display region 21 and indicates that a new playlist is assigned to the region 21 or that the display region 21 discloses the content of such a playlist. A movement aid 210 is illustrated in a symbol-like manner and is also discussed later.

Figure 1F:
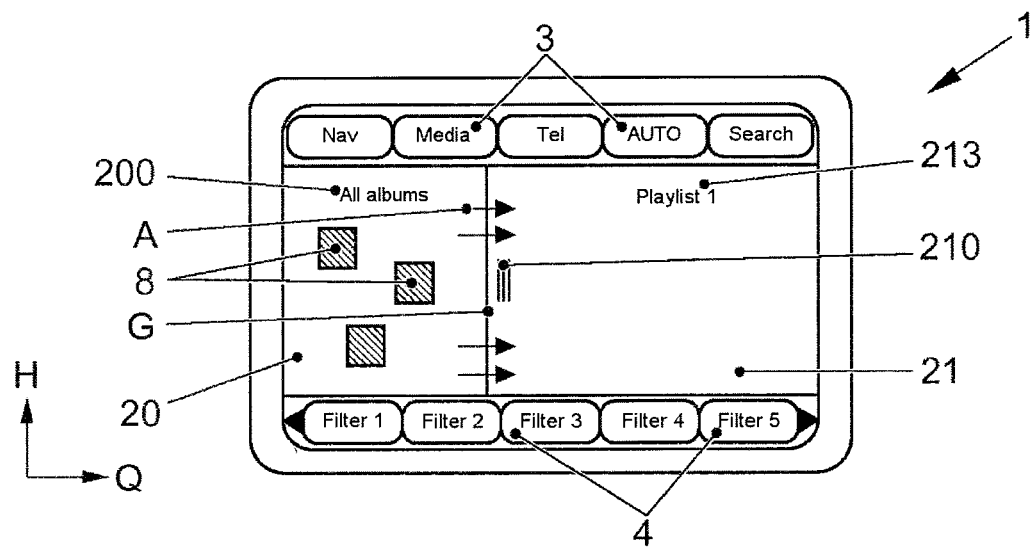
Figure 1G:
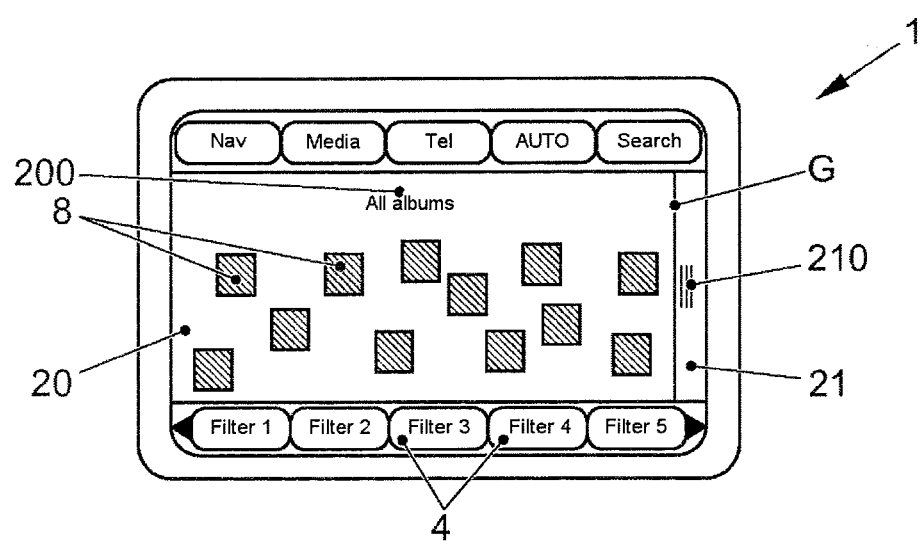

On the basis of this, a pop-up window 211 having help text is displayed (cf. FIG. 1e), after the confirmation of which (OK field 212), the pop-up window 211 disappears and the user arrives at the displays according to FIGS. 1f and 1g.

The transition to FIGS. 1f to 1g is effected by means of an animation A. In the case of the latter, the boundary G and therefore the initially larger, second display region 21 move in the direction of the transverse axis Q (already mentioned) from left to right, with the result that the second display region 21 becomes smaller and smaller and the first display region 20 becomes larger and larger. Finally, the boundary G assumes a position according to FIG. 1g.

The second region 21 is therefore modeled on an (initially still empty) drawer which is moved from an open state to a closed state.

The first display region 20 is now very much larger and shows at least some of all available MP3 files (albums 8). Text 200 which also illustrates this can be additionally provided ("all albums").

It is clear that the available music albums 8 are again displayed in a map. The keys 4 are used to provide available filters which can be used by the operator to influence the sorting criteria for the already mentioned two-dimensional display of the basic set of all available music albums 8.

In a departure from the exemplary embodiment, another direction of the animation A is also naturally conceivable. For example, the boundary G may also be in a horizontal line and may be moved in the vertical direction H of the display surface 2.

Figure 2A:
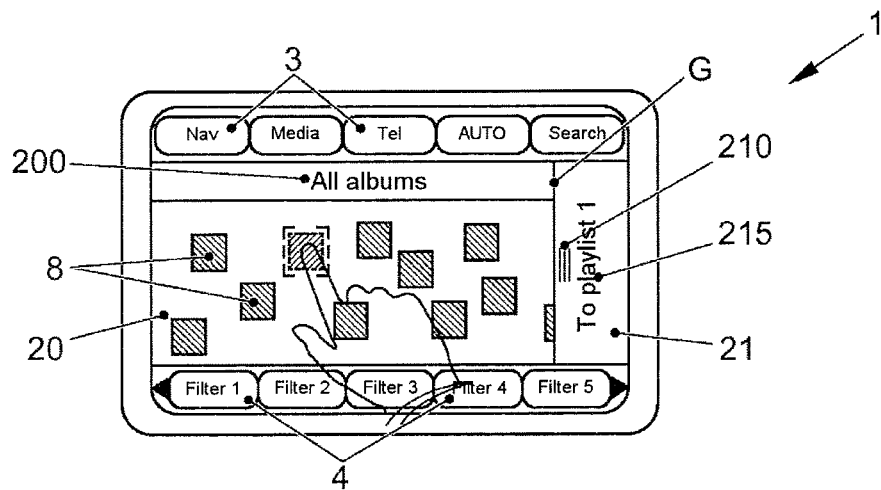
FIGS. 2a-c show designation of music albums for a playlist.
Figure 2B:
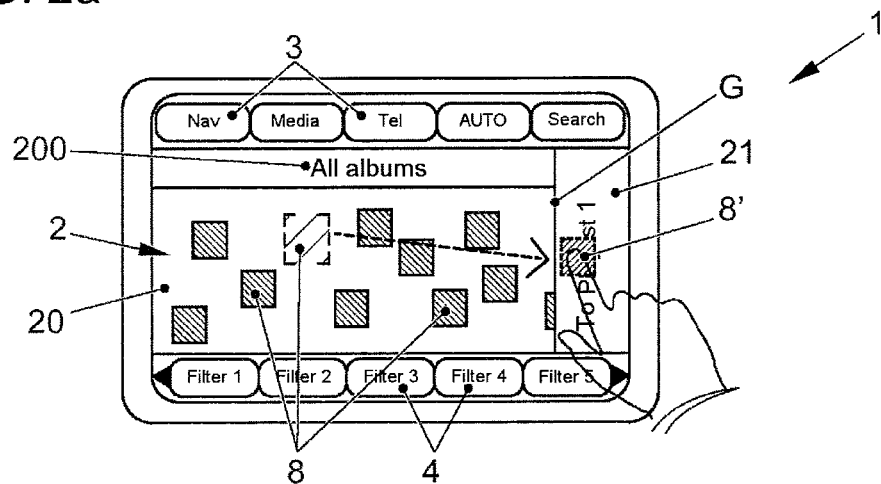
Figure 2C:
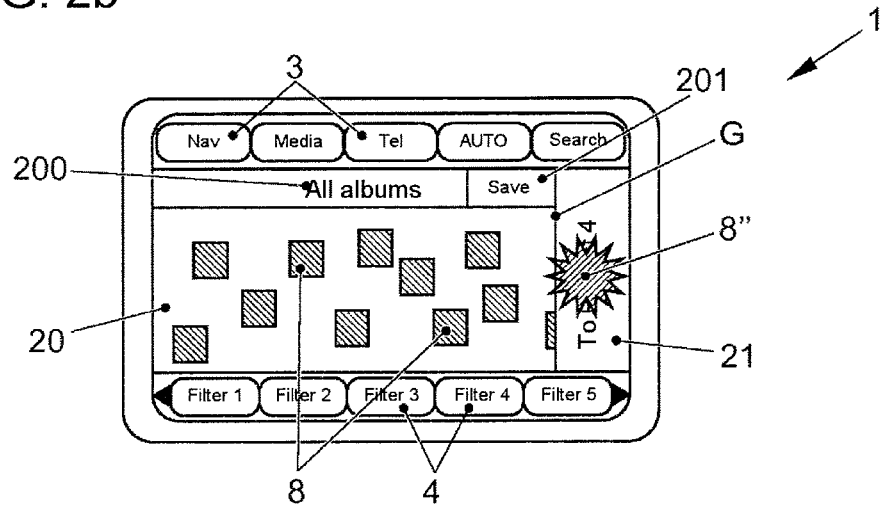

FIG. 2 is now intended to be used to illustrate how music albums 8 are designated (on the basis of the display according to FIG. 1g) for the purpose of producing a playlist.

Each album 8 represents, as a designation object, a plurality of music files (data records) stored in a memory. One of the music albums 8 is graphically highlighted (cf. FIG. 2a) by touching it. It is additionally conceivable for a text field 215 to appear in the second display region 21, which text field provides the operator with an additional instruction (for example "to playlist 1"). After an album 8 has been marked in the first display region 20, this marked object is moved to the second display region 21 (8', compare FIG. 2b) and the marking of the album 8' is subsequently removed by relinquishing touch of the display surface 2, with the result that successful designation of the album 8 and therefore its logical linking to a new playlist are acknowledged haptically, acoustically and/or optically, for example by means of vibration, a change in color or an animation (8") (cf. FIG. 2c).

The procedure described according to FIG. 2 can be continued in any desired manner. From time to time, the operator may select a desired section of the basic set of all available music albums 8 as required by means of swiping or moving gestures or else may stipulate his sorting criteria by selecting a corresponding key 4 as desired.

The described method makes it possible to create a playlist in an extremely intuitive manner by means of simple drag-and-drop, that is to say in a previously completely unusual manner.

In addition, it is possible to quickly find the desired basic data records as a result of the combination with the already mentioned two-dimensional sorting in a map display. In a similar manner, individual titles or individual data records of an album 8 may be added to a playlist. This is explained using FIG. 3.

Figure 3A:
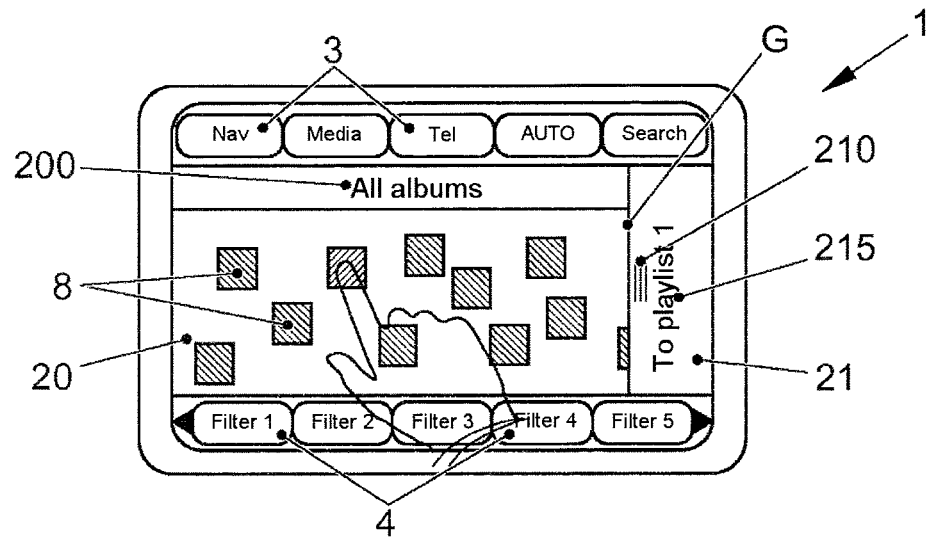
FIGS. 3a-d show designation of music titles for a playlist.
Figure 3B:
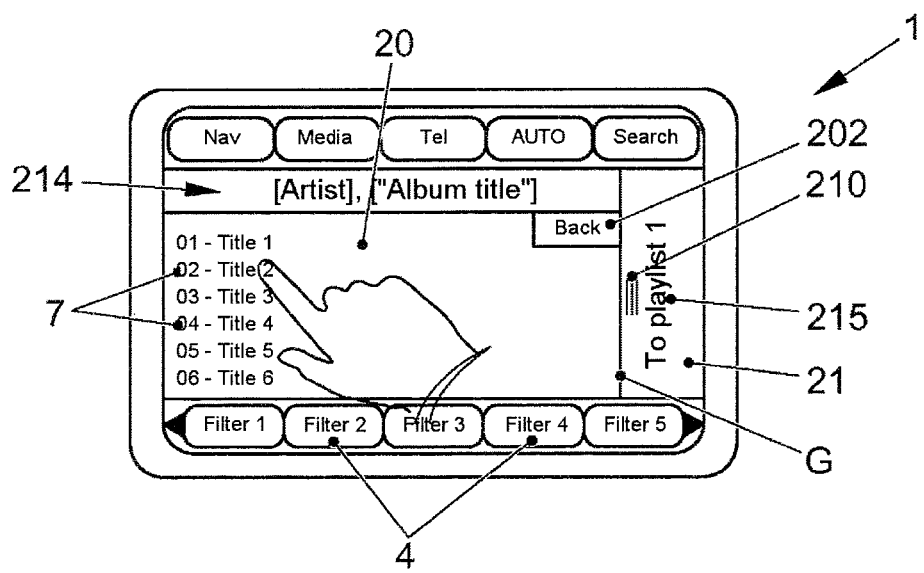

On the basis of a display according to FIG. 1g, the operator can open one of the music albums 8 by lightly tapping on it (cf. FIG. 3a) and all music titles 7 contained in the music album 8 are displayed in a pop-up (possibly also in a semi-transparent manner) on the display surface 2, more precisely in a list in the first display region 20 (FIG. 3b). Text fields 214 which describe the selected artist and the title of the opened album may be present above the display in a list. A back key 202 can be used to select the view from the display of the titles 7 in a list back to the album view according to FIG. 3a.

When one of the titles 7 is touched and therefore marked, an indication in a text field 215 or a symbol may appear in the second display region 21, in a similar manner to that when adding a complete album 8 to a playlist, which indication indicates that moving a marked title 7 to the second display region 21 adds it to the playlist.

Figure 3C:
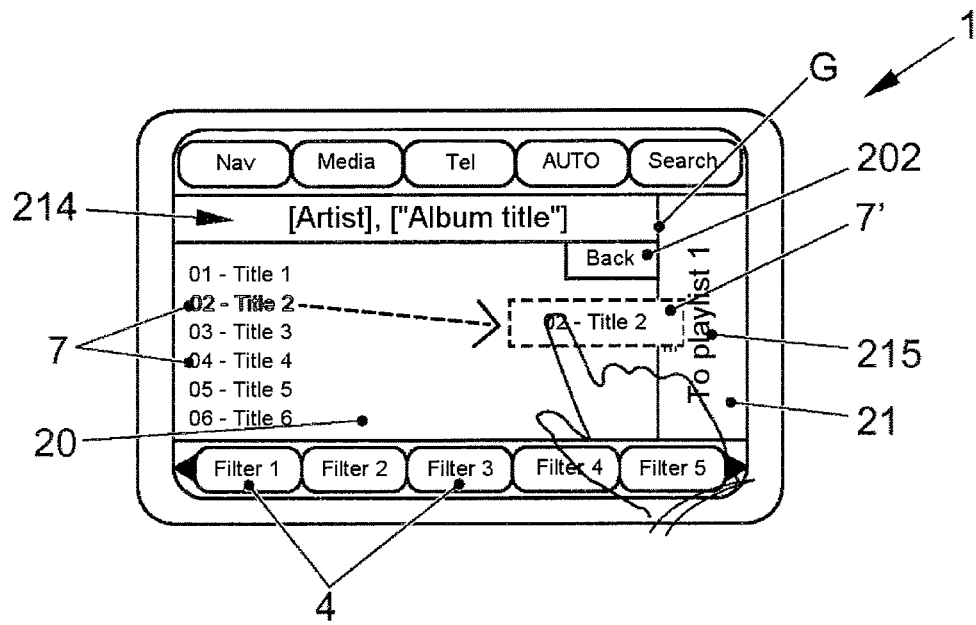

FIG. 3c illustrates the movement of a marked title 7 to the second display region 21 and the therefore changed position (7') of the marked title. After the marking has been removed by relinquishing touch, optical feedback (7''') relating to the fact that a title 7 has been successfully added to the playlist is provided in a small animation in a similar manner to FIG. 2c. The changed playlist can be stored using a storage field 201 (cf. FIG. 3d).

Individual titles are therefore likewise added to a playlist in an extremely intuitive manner by means of simple "drag-and-drop".

FIG. 4 is now used to describe how a playlist can be selected from playlists which have already been created and can be changed. On the basis of FIG. 1b and actuation of a key 4 "playlist", an operator arrived at the display according to FIG. 4a.

All existing playlists are displayed on the display surface 2 if possible in this display. Four playlists WL1 to WL4 have already been produced in the exemplary embodiment, only the playlists WL1, WL2 and WL4 being visible on the display surface 2. The playlist WL3 which is currently not visible can also be "fetched" onto the display surface 2 by means of corresponding moving or swiping gestures.

A corresponding function is again assigned to the keys 4 on the basis of the context and the existing playlists WL1 to WL4 are again presented in a type of map display.

Different sorting criteria may likewise be used to display the playlists. A key 4 "currentness" can be seen, after the selection of which the playlists are sorted according to the time of their creation in the direction of the already mentioned transverse axis Q, for example. Another key 4 "name" enables alphabetical sorting according to the name of the playlists in the direction of the vertical axis H.

It is noted that the map-like display of the playlists changes to a list-based display when one of the described sorting criteria is selected.

A key 4 ("new playlist") is also provided in the map-like view of the playlist and can be used to initiate the creation of a new playlist in the manner already described (compare FIG. 1c).

Figure 4A:
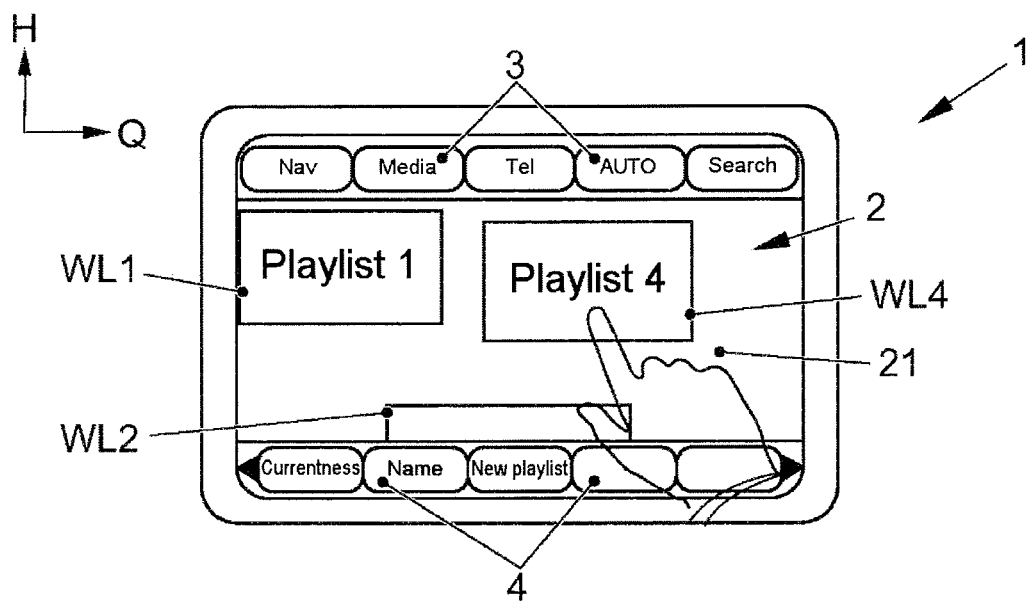
FIGS. 4a-d show selection and display of a particular playlist.
Figure 4B:
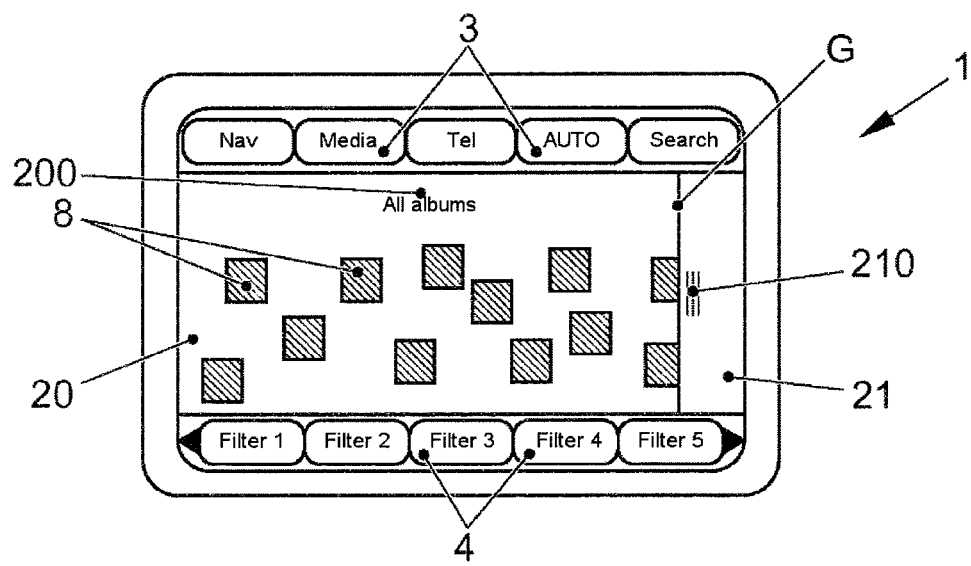
Figure 4C:
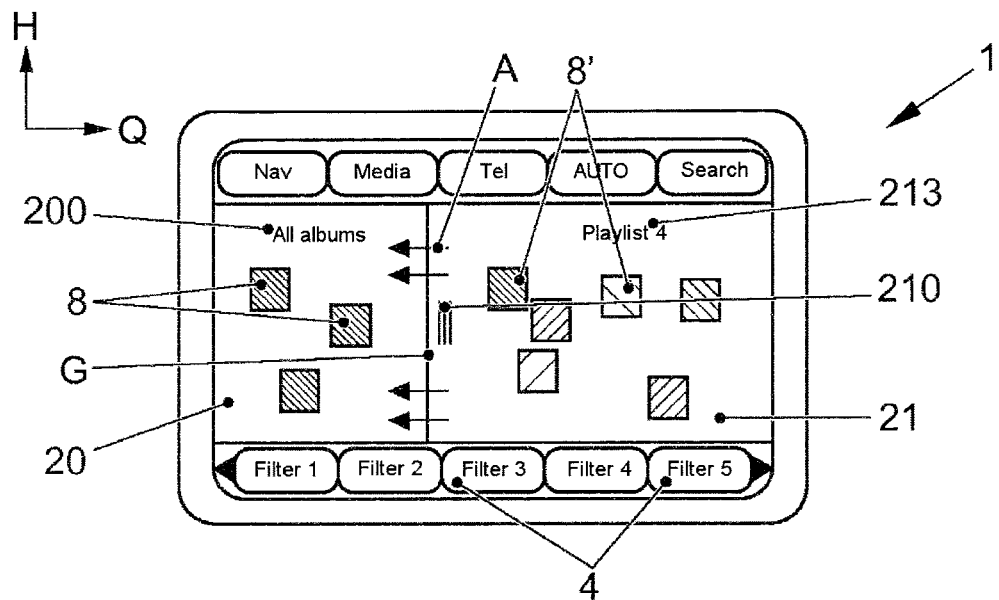

However, if the operator would like to open and process an existing playlist (for example the playlist WL4 ("playlist 4")), he briefly taps on the associated symbol on the display surface 2 and therefore arrives at a display according to FIG. 4b.

As a result, the display surface 2 is again divided into the first display region 20 and the second display region 21, the display region 21 initially being displayed as being very much smaller on the right-hand side of the display surface 2. The display regions 20, 21 are graphically separated again by means of a linear boundary G running vertically in the figure. The first display region 20 again contains (if possible) a map-like display of all available albums 8. A corresponding text field 200 which refers to this basic set is additionally provided again.

Figure 4D:
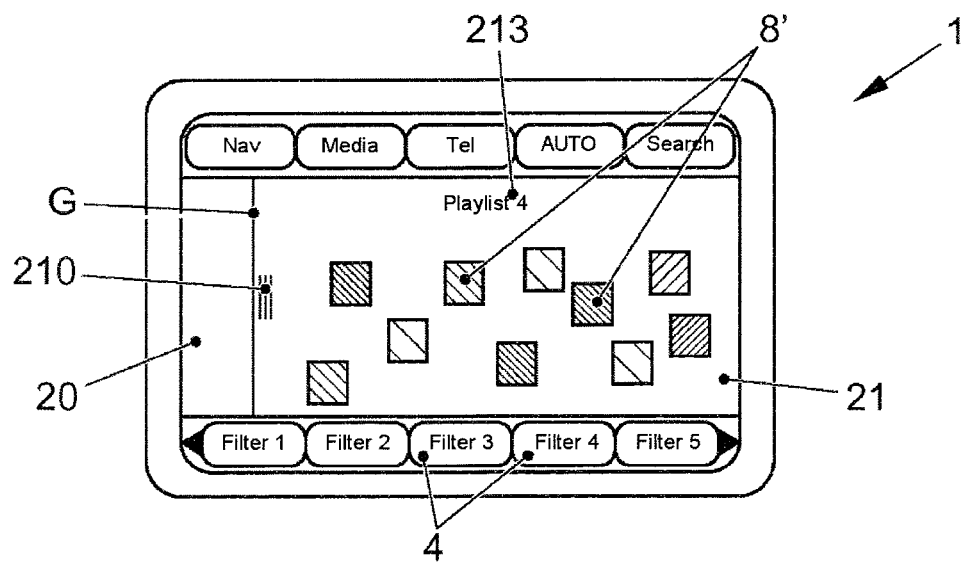

On the basis of this display, an animation A (compare FIG. 4c) starts and the boundary G and therefore the second region 21 are moved from right to left, that is to say in the direction of the transverse axis Q, with the result that the second region increases in size and finally comes to rest according to FIG. 4d. In this position, the second display region 21 is now considerably larger than the first display region 20.

The second display region 21 has therefore been pulled out in a drawer-like manner, thus also making it clear that it is possible to change over between the view according to FIG. 4d and the view according to FIG. 4b with the aid of the symbol-like movement aid 210 by simply moving the "drawer" or the movement aid 210.

A text field 213 which indicates the name of the selected playlist ("playlist 4") is again additionally provided. The music albums 8' present in a playlist are again displayed in a map, in which case the operator can use different sorting criteria (two-dimensional filters) in the manner already described using the keys 4. The operator can therefore also quickly find, in the view of a playlist, albums 8' or titles 7' which he wishes to delete from a playlist again.

FIG. 5 is used to describe how an album can be deleted from a playlist. An album 8' to be deleted from the playlist (playlist 4) is marked by the operator by touching it, in which case a text field 215 ("delete from playlist 4") is simultaneously displayed in the first display region 20 and provides information relating to where an album 8' to be deleted must now be moved (compare FIG. 5a).

After a marked album 8' has been moved from the second display region 21 to the first display region 20 (8''', compare FIG. 5b) and the marking has subsequently been removed by the operator relinquishing touch of the display surface 2, graphical feedback (8'') relating to the successful removal of an album 8' from the playlist is again provided (compare FIG. 5c).

After a playlist has been changed by deleting music albums 8' in the described manner, a corresponding storage field 201 is provided for the purpose of storing the changes.

As already mentioned, it is possible to change between the "playlist view", in which the content of a playlist (that is to say the albums 8' designated in the described manner) is visible (FIG. 4d), and the "complete view", in which the basic set of all albums 8 or titles 7 is visible (FIG. 4b), by pushing the movement aid 210 back and forth. Easily comprehensible opening or closing of a drawer-like playlist is therefore modeled for the operator.

Figure 5A:
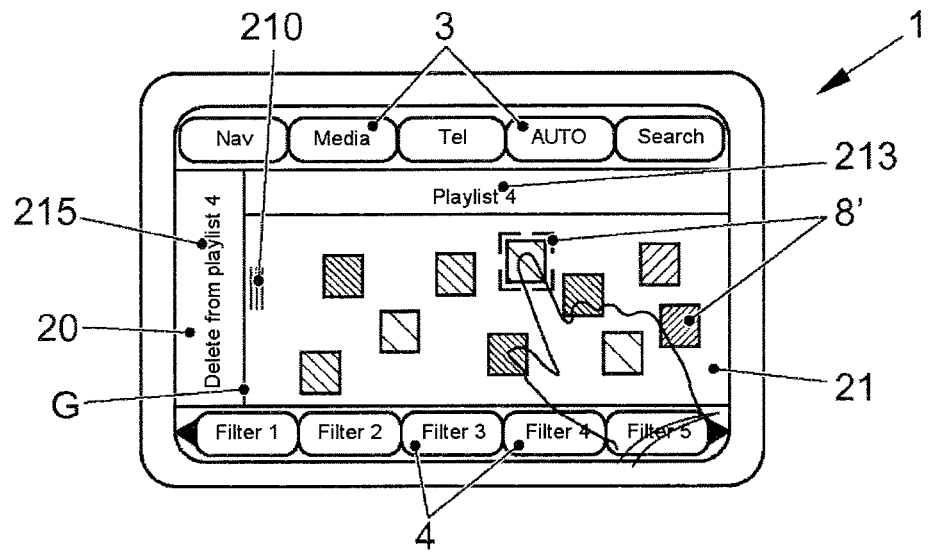
FIGS. 5a-c show deletion of an album from a playlist.
Figure 5B:
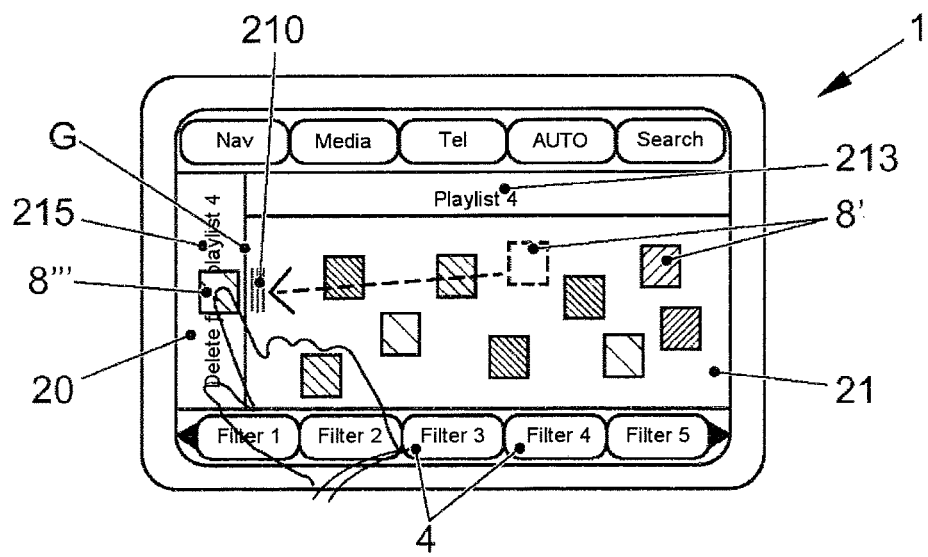
Figure 5C:
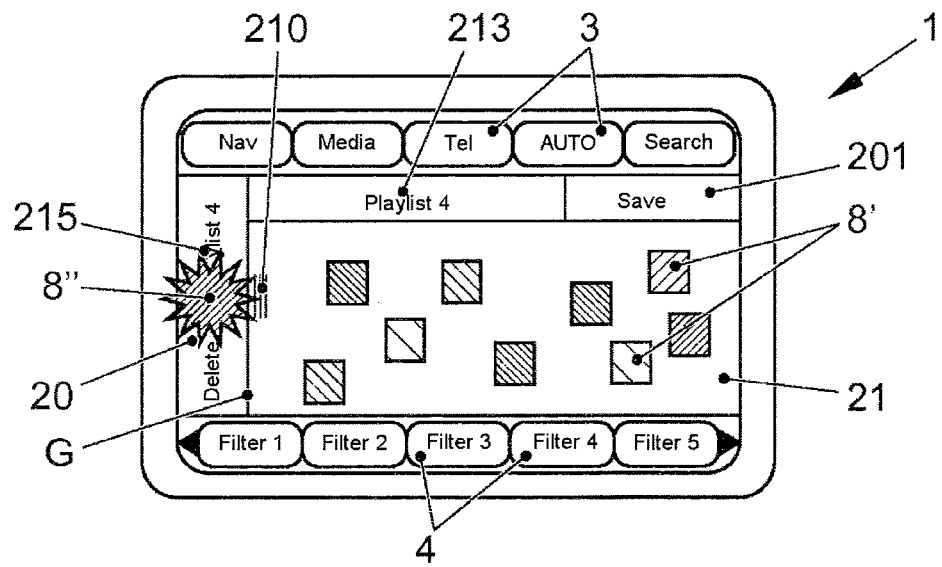

To remove individual music titles from a playlist, in a manner similar to FIG. 3a, an album 8' must first of all be selected by tapping on it in the view according to FIG. 5a, with the result that the album is opened and its titles are displayed (in a similar manner to FIG. 3b). A title can then again be deleted from a playlist by marking and accordingly moving the title to the first display region 20 and relinquishing touch (in a similar manner to FIGS. 3c and d).

Figure 3D:
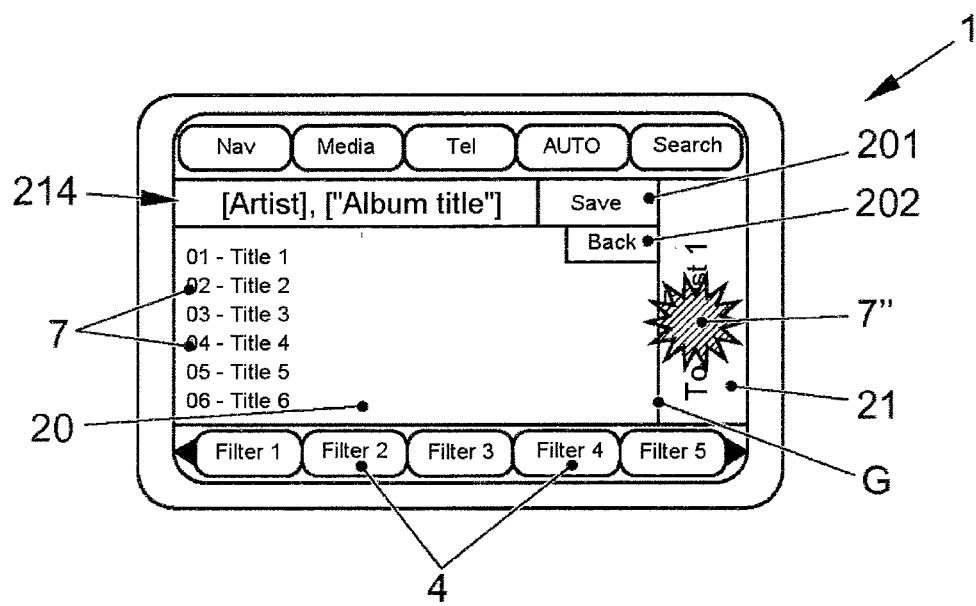

After a playlist has been changed by deleting music titles in the described manner, a corresponding storage field 201 is provided for the purpose of storing the changes in a similar manner to FIG. 3d.

Figure 5D:
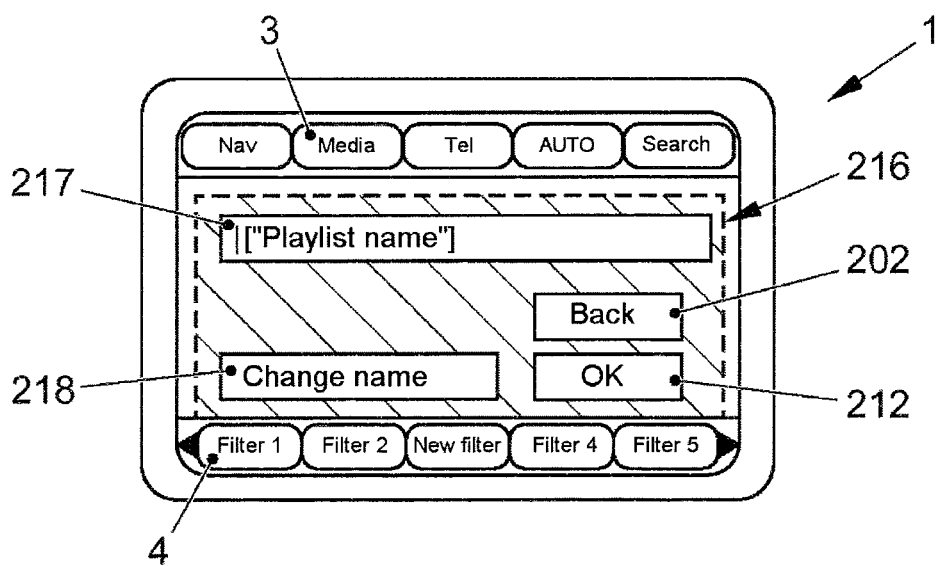
FIG. 5d shows storage of changes which have been made to a playlist.
Figure 5E:
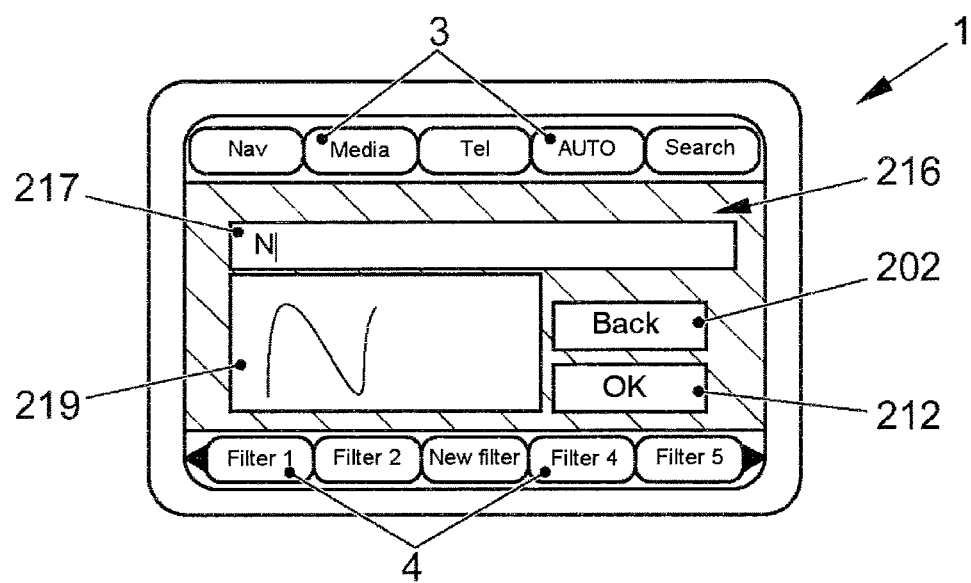
FIG. 5e shows a handwriting recognition field into which information can be input.

After the storage field 201 has been touched, a pop-up input region 216 is opened and displays a name field 217, a name change field 218, a back key 202 and an OK field 212 (FIG. 5d).

If an existing playlist has been changed in the described manner, the existing name of the playlist appears in the name field 217. If a new playlist has been created (compare FIG. 2c and FIG. 3d), the text "playlist name" appears in the name field 217 and indicates the now possible naming of a new playlist.

The OK field 212 can be used to store a playlist under the existing name or a newly input name. The operator uses the back key 202 to arrive back at the view according to FIG. 5c or FIG. 3d or FIG. 2c.

Touching the name change field 218 or the name field 217 results in the opening of a handwriting recognition field 219

(compare FIG. 5e), into which the corresponding letters of a (new) name for a playlist can be input.

Figure 7:
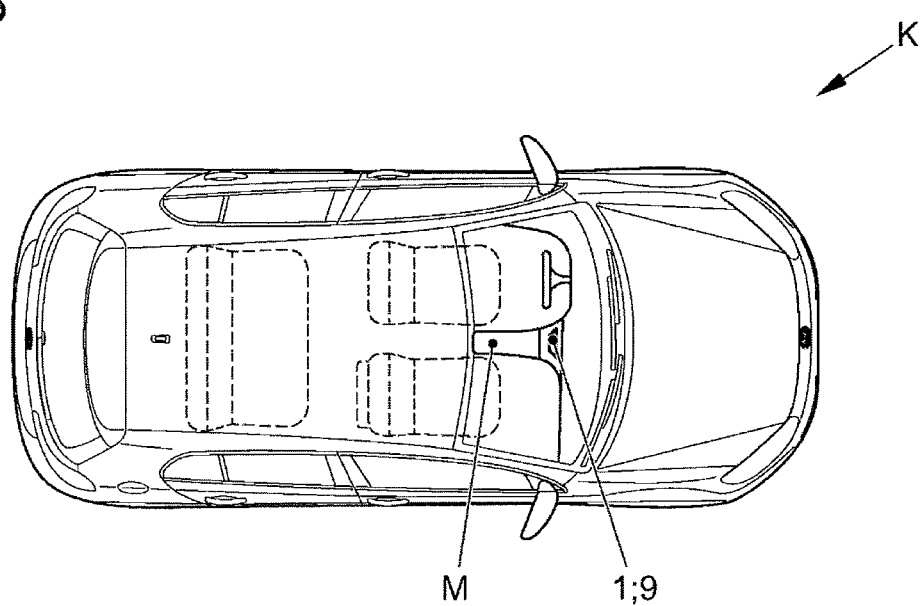
FIG. 7 shows a motor vehicle having a driver assistance system for carrying out the disclosed method.

FIG. 6 now shows, in an extremely schematic manner, a driver assistance system 15 of a motor vehicle K illustrated in FIG. 7.

In this case, the driving assistance system 15 combines, in a manner which is not illustrated in any more detail, at least the functionalities of a navigation system, an infotainment system for playing or listening to music, a telecommunications system and a system for adjusting particular operating parameters of the motor vehicle K.

The driving assistance system 15 comprises a central information processing unit 10 having a plurality of computing units 14 connected in a manner not illustrated in any more detail, an input unit 9 connected to the information processing unit 10 and a display unit 1 connected to the information processing unit 10.

In at least one exemplary embodiment, the display unit 1 and the input unit 9 are in a structural unit, namely in a touchscreen. A permanently installed memory unit 11 and a mobile memory unit 12 (for example a USB stick) which can be connected are also provided for the purpose of interchanging data with the information processing unit 10. The memory units 11 and 12 store or can store data records 110 and 120 which may correspond to the music titles 7 and the music albums 8 or else map data for a navigation system.

The data needed for the above-described two-dimensional sorting have expediently already been produced "off-line" at a suitable computer workstation.

A mobile telecommunications device 13, for example a smartphone or a conventional mobile telephone, can also be connected to the driver assistance system 15 via a corresponding interface, the memory of the telecommunications device 13 storing contact or address data records 130.

The mobile telecommunications device 13 can also be used to establish a connection to the Internet (indicated by a lightning symbol).

Apart from the exemplary embodiment illustrated, however, it is also entirely possible for the method to be carried out only in a computer (PC or laptop) or else only in a mobile telecommunications device (for example smartphone) and to then contribute there to being able to create playlists or contact favorites lists in a simple and intuitive manner, for example.

It is clear from FIG. 7 that the display and input unit (1, 9) of the driver assistance system 15 is arranged as a touchscreen in the region of a center console M of the motor vehicle K.

These exemplary embodiments were used only to generally explain the core concept. Other embodiments or forms other than those described above may be within the scope of its protection. In this case, other embodiments may also have, in particular, those features which constitute a combination of individual features of the respective claims.

Illustrative embodiments relate to a method for designating a subset of a basic set of data records stored in a memory unit and for visualizing at least a part of the designated subset on a display unit.

Such a method is known from EP 1 850 092 A1 and also from US 2008/0313222 A1.

Both documents are based on the problem of providing an improved method for creating so-called playlists.

In recent years, the possibility of being able to store large quantities of audio and video data (for example in MP3 and/or MP4 files) in a cost-effective manner has increased enormously and is also used in practice.

To now be able to create playlists, which generally represent only a personal and taste-based selection by a user from the basic set of his stored files, in a practical manner despite the partially huge volume of data, the documents are turning away from the previously conventional, purely list-based creation of such playlists.

Both documents propose the practice of displaying the basic set of available data records on a display unit in a map-like manner.

In EP 1 850 092 A1, virtual "islands" are displayed on a display unit, the virtual islands each being intended to represent a particular music style (rock, classical, folk, jazz, etc.). In this case, a multiplicity of music titles (music files) of the same music genre are therefore assigned to each virtual island. In this case, the user is able to zoom into these islands as far as the available music titles, each island containing towns each representing a musician and each town in turn containing houses each corresponding to a music title.

To designate a plurality of data records and therefore to create a playlist, a user must only define a "route" through the map-like structure, similar to the procedure during routing by a navigation system. In this case, the user can zoom into and out of the respective island or town maps by selecting image regions on the display unit and can thus select towns or houses and therefore individual music files or entire groups of music files by tapping on the island or town map displayed.

It is therefore possible to dispense with complicated list-based music selection.

A map-like representation of music files is carried out in a similar manner in US 2008/0313222 A1. In this case, "similar" artists are positioned close together, with the result that clusters of artists having similar properties are formed. In this case, the properties are based on selection criteria such as mood, genre, year of release, etc. In this case, the file clusters can be represented in a two-dimensional manner, in which case, for example, an organization of the clusters on a display device from bottom to top corresponds to an increasing tempo and an organization of the file clusters from left to right corresponds to a chronological sequence. To create a playlist, the user must define "route points" on the map-like representation. The path through the route points then represents the created playlist.

List-based creation of a playlist is no longer required in this case either.

LIST OF REFERENCE SYMBOLS

1 Display unit
2 Touch-sensitive display surface
20 First display region
200 Text
201 Storage field
202 Back key
21 Second display region
210 Symbol-like movement aid
211 Pop-up window with help text
212 OK field
213 Text field
214 Text fields
215 Text field
216 Pop-up input region
217 Name field
218 Name change field
219 Handwriting recognition field 3 Keys permanently assigned to particular functions (hard keys)
4 Keys having functions assigned on the basis of the context (soft keys)
5 Object cluster
7 MP3 files (titles)
8 MP3 files (albums)
9 Input unit
10 Central information processing unit
11 Memory unit
110 Data records
12 Memory unit
120 Data records (MP3 files)
13 Mobile telecommunications device
130 Data records (contact data records)
14 Computing units
15 Driver assistance system
A Animation
G Graphical boundary between the display regions
H Vertical axis of the display surface
K Motor vehicle
M Center console
Q Transverse axis of the display surface
WL Playlists

The invention claimed is:

1. A method for designating and displaying a subset of a basic set of data records in a motor vehicle driving assistance system that includes a navigation system and an infotainment system for playing or listening to music, the method comprising:
storing, in at least one memory unit included in the infotainment system, the basic set of data records;
visualizing at least a part of the designated subset on a display unit included in the motor vehicle driving assistance system;
forming at least two graphically delimited display regions on the display unit of the motor vehicle driving assistance system;
displaying designation objects which represent data records from the basic set in a first display region of the display unit of the motor vehicle driving assistance system;
displaying a plurality of keys on the display unit of the motor vehicle driving assistance system, wherein each key of the plurality of keys is representative of a sorting criteria for the data records;
selecting a first sorting criteria through a touch of a first key of the plurality of keys;
assigning a subset of the designation objects which has been designated or is to be designated to a second display region of the display unit of the motor vehicle driving assistance system;
generating the assigned subset by marking at least one designation object in the first display region of the display unit of the motor vehicle driving assistance system, and moving the marked at least one designation object into the second display region of the display unit and subsequently removing the marking,
wherein subsequent to removing the marking, a storage field is automatically and newly displayed for storing changes in the second display region, a field is displayed to input a name for the second display region,
wherein the data records displayed on the display unit of the motor vehicle driving assistance system are arranged two-dimensionally along a vertical axis based on the selected first sorting criteria and along a transverse axis based on a second selected sorting criteria, and
wherein the first and second sorting criterion are two-dimensional filters used to order the display in a two dimensional structure on the display unit of the motor vehicle,
wherein the second region is changed so that at least a part of the designated subset is displayed on the display unit instead of at least a part of the basic set, and
wherein the second region is changed, as displayed in a plan view of a display surface of the display unit, by moving a boundary of the second region in the transverse direction or vertical direction of the display surface.

2. The method of claim 1, wherein, to display the at least one part of the basic set or the at least one part of the designated subset, the boundary of the second region is moved from one side of the display surface in the direction of an opposite side of the display surface.

3. The method of claim 1, wherein optical, acoustic and/or haptic feedback is provided after a data record has been successfully designated.

4. The method of claim 1, wherein an animation is activated, in which the second display region changes from a maximum size to a minimum size.

5. The method of claim 1, wherein an animation is activated, in which the second display region changes from a minimum size to a maximum size.

6. The method claim 1, wherein the field is displayed to input the name for the second display region in response to selecting the storage field.

7. A driver assistance system in a motor vehicle that includes a navigation system and an infotainment system for playing or listening to music, the driver assistance system comprising:
at least one central information processing unit;
at least one memory unit to store a basic set of data records, wherein the at least one memory unit is or can be connected to the at least one central information processing unit;
at least one input unit that includes a plurality of keys, wherein each key of the plurality of keys is representative of a sorting criteria for the data records; and
at least one display unit,
wherein the at least one central information processing unit is to form at least two graphically delimited display regions on the at least one display unit, wherein the at least one display unit is to display designation objects which represent data records from the basic set in a first display region of the at least one display unit,
wherein the at least one input unit is further to receive a selection of a first sorting criteria through a touch of a first key of the plurality of keys,
wherein the at least one central information processing unit is to assign a subset of the designation objects which has been designated or is to be designated to a second display region of the at least one display unit and generate the assigned subset,
wherein to generate the assigned subset includes to mark at least one designation object in the first display region of the display unit, and move the marked at least one designation object into the second display region of the display unit and subsequently remove the marking, and
wherein subsequent to removing the marking, a storage field is automatically and newly displayed for storing changes made in the second display region, and a field is displayed to input a name for the second display region in response to selecting the storage field, wherein the data records displayed on the at least one display unit are arranged two-dimensionally along a vertical axis based on the selected first sorting criteria and along a transverse axis based on a selected second sorting criteria, wherein the first and second sorting criterion are two-dimensional filters used to order the display in a two dimensional structure on the display unit of the motor vehicle, wherein the second region is changed so that at least a part of the designated subset is displayed on the display unit instead of at least a part of the basic set, and wherein the second region is changed, as displayed in a plan view of a display surface of the display unit, by moving a boundary of the second region in the transverse direction or vertical direction of the display surface.

8. The driver assistance system of claim 7, wherein, to display the at least one part of the basic set or the at least one part of the designated subset, the boundary of the second region is configured to move from one side of the display surface in the direction of an opposite side of the display surface.

9. The driver assistance system of claim 7, wherein the system is configured to provide optical, acoustic and/or haptic feedback after a data record has been successfully designated.

10. The driver assistance system of claim 7, wherein the system is configured to remove a designation of a data record by marking a designation object in the second display region, moving the marked designation object into the first display region and subsequently removing the marking.

11. The driver assistance system of claim 7, wherein the system is configured to activate an animation, in which the second display region changes from a maximum size to a minimum size.

12. The driver assistance system of claim 7, wherein the system is configured to activate an animation, in which the second display region changes from a minimum size to a maximum size.

13. The driver assistance system of claim 7, wherein the field is displayed to input the name for the second display region in response to selecting the storage field.

* * * * *